US009399167B2

(12) United States Patent
Glaser et al.

(10) Patent No.: US 9,399,167 B2
(45) Date of Patent: Jul. 26, 2016

(54) VIRTUAL SPACE MAPPING OF A VARIABLE ACTIVITY REGION

(75) Inventors: Russell Glaser, Woodinville, WA (US); Steven Michael Beeman, Kirkland, WA (US); Peter Glenn Sarrett, Redmond, WA (US); Scott Henson, North Bend, WA (US); Robert Sheldon Walker, Seattle, WA (US); John Clavin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1869 days.

(21) Appl. No.: 12/251,193

(22) Filed: Oct. 14, 2008

(65) Prior Publication Data

US 2010/0093435 A1 Apr. 15, 2010

(51) Int. Cl.
*A63F 9/24* (2006.01)
*A63F 13/40* (2014.01)
*A63F 13/22* (2014.01)
*A63F 13/428* (2014.01)

(52) U.S. Cl.
CPC ............... *A63F 13/10* (2013.01); *A63F 13/22* (2014.09); *A63F 13/428* (2014.09); *A63F 2300/1006* (2013.01); *A63F 2300/1018* (2013.01); *A63F 2300/6045* (2013.01)

(58) Field of Classification Search
CPC ............ A63F 2300/6045; A63F 13/00; A63F 2300/609; A63F 13/02; A63F 13/06; A63F 13/12; A63F 13/20; A63F 13/22; A63F 13/428

USPC ...................................................... 463/36–39
See application file for complete search history.

(56) References Cited

U.S. PATENT DOCUMENTS

| 6,160,556 | A | 12/2000 | Kinoe et al. | |
| 6,308,565 | B1 * | 10/2001 | French et al. | 73/379.04 |
| 6,337,700 | B1 | 1/2002 | Kinoe et al. | |
| 6,461,238 | B1 * | 10/2002 | Rehkemper et al. | 463/6 |
| 7,331,856 | B1 * | 2/2008 | Nakamura et al. | 463/7 |
| 2004/0239670 | A1 * | 12/2004 | Marks | 345/419 |

(Continued)

FOREIGN PATENT DOCUMENTS

EP 1443768 A1 8/2004

OTHER PUBLICATIONS

"Win an Area-51", Alienware High Performance Systems, 2006, 50 pages.

(Continued)

*Primary Examiner* — Lawrence Galka
(74) *Attorney, Agent, or Firm* — Gregg Wisdom; Judy Yee; Micky Minhas

(57) ABSTRACT

An electronic game system and a method of its operation are provided for virtual space mapping of a variable activity region in physical space. A calibration input may be received from a positioning device of a game controller that indicates waypoints that define an activity region in physical space. A scale factor may be identified between the activity region and an interactive game region in virtual space based on the calibration input. Positioning information may be received from the positioning device that indicates a position of the positioning device within the activity region. The position of the positioning device within the activity region may be mapped to a corresponding virtual position within the interactive game region based on the scale factor.

23 Claims, 4 Drawing Sheets

(56) References Cited

U.S. PATENT DOCUMENTS

| | | | |
|---|---|---|---|
| 2005/0124412 A1* | 6/2005 | Son et al. | 463/30 |
| 2006/0062427 A1 | 3/2006 | Burkhart et al. | |
| 2007/0257912 A1 | 11/2007 | Repin | |
| 2008/0111732 A1 | 5/2008 | Bublitz et al. | |
| 2009/0215536 A1* | 8/2009 | Yee et al. | 463/42 |

OTHER PUBLICATIONS

LeBlanc, et al., "Retrieval of Hidden Data—the Flip Side of Decluttering", 12th International Command and Control Research & Technology Symposium, Newport, Rhode Island, U.S.A., Paper 113, Jun. 19-21, 2007, pp. 1-16.

* cited by examiner

VIRTUAL SPACE MAPPING OF A VARIABLE ACTIVITY REGION

BACKGROUND

Electronic game systems enable users to participate in interactive games. Some electronic game systems may be configured to track the position of one or more electronic game controllers. Users of these electronic game systems may participate in the interactive games, at least in part, by physically moving their electronic game controller.

SUMMARY

An electronic game system and a method of its operation are provided for virtual space mapping of a variable activity region in physical space. In one embodiment, a calibration input may be received from a positioning device of a game controller that indicates waypoints that define an activity region in physical space. A scale factor may be identified between the activity region and an interactive game region in virtual space based on the calibration input. Positioning information may be received from the positioning device that indicates a position of the positioning device within the activity region. The position of the positioning device within the activity region may be mapped to a corresponding virtual position within the interactive game region based on the scale factor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Users having different ranges of mobility due to health constraints, personal preference, or physical limitations of the user's physical environment may utilize virtual space mapping of a variable activity region in physical space. As provided herein, user participation in an interactive game of an electronic game system may be personalized through virtual space mapping of a variable activity region in physical space to more suitably compliment the specific needs or preferences of each user and/or the physical space at which each user participates in an interactive game.

Figure 1:
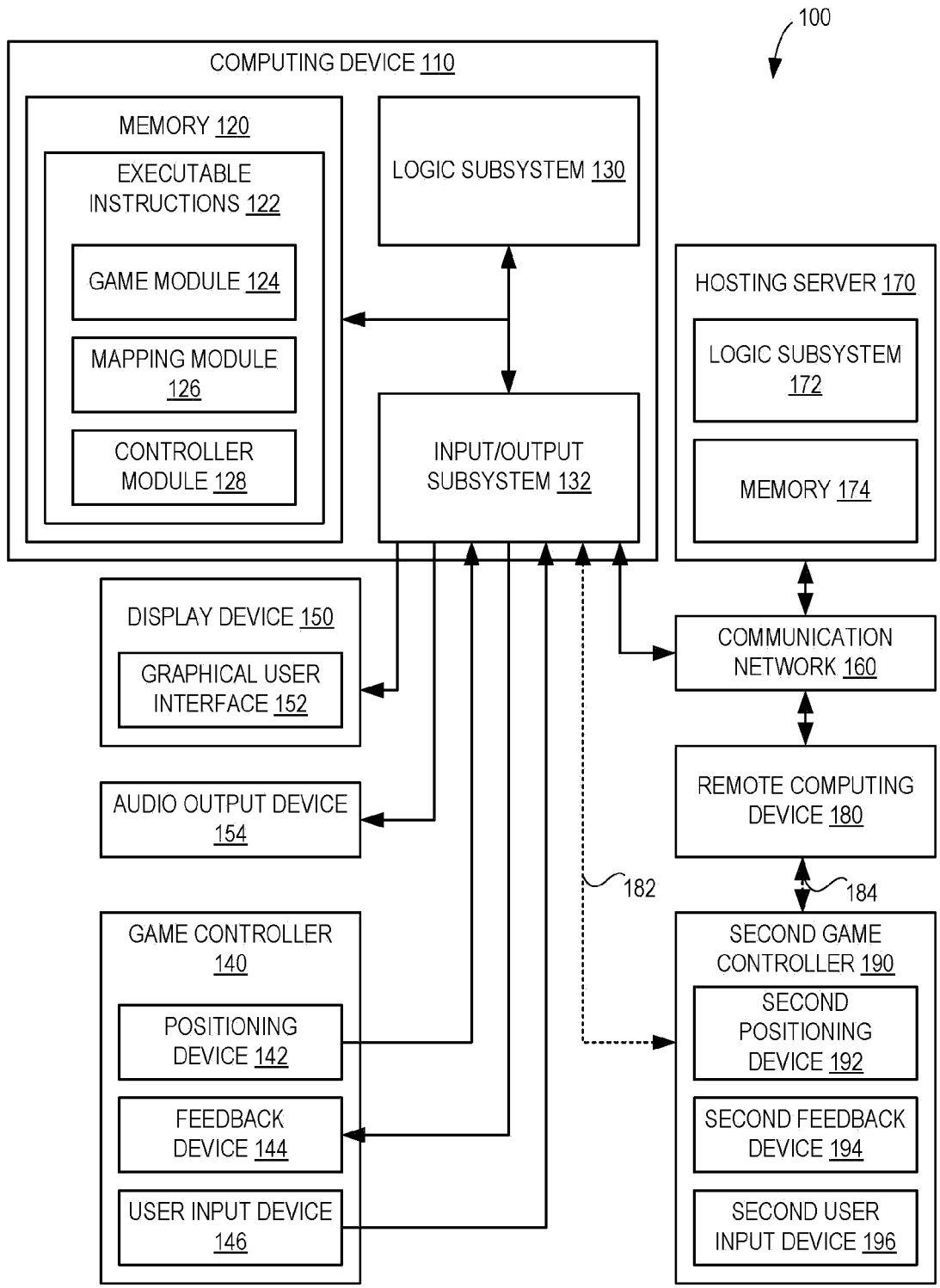
FIG. 1 shows a schematic representation of an example embodiment of an electronic game system configured to facilitate an interactive game.

FIG. 1 shows an example embodiment of an electronic game system 100 configured to facilitate an interactive game. The term "interactive game" may refer generally to a structured activity, which may be undertaken by one or more users for enjoyment, exercise, education, and/or other suitable purpose through interaction with the electronic game system.

Figure 3:
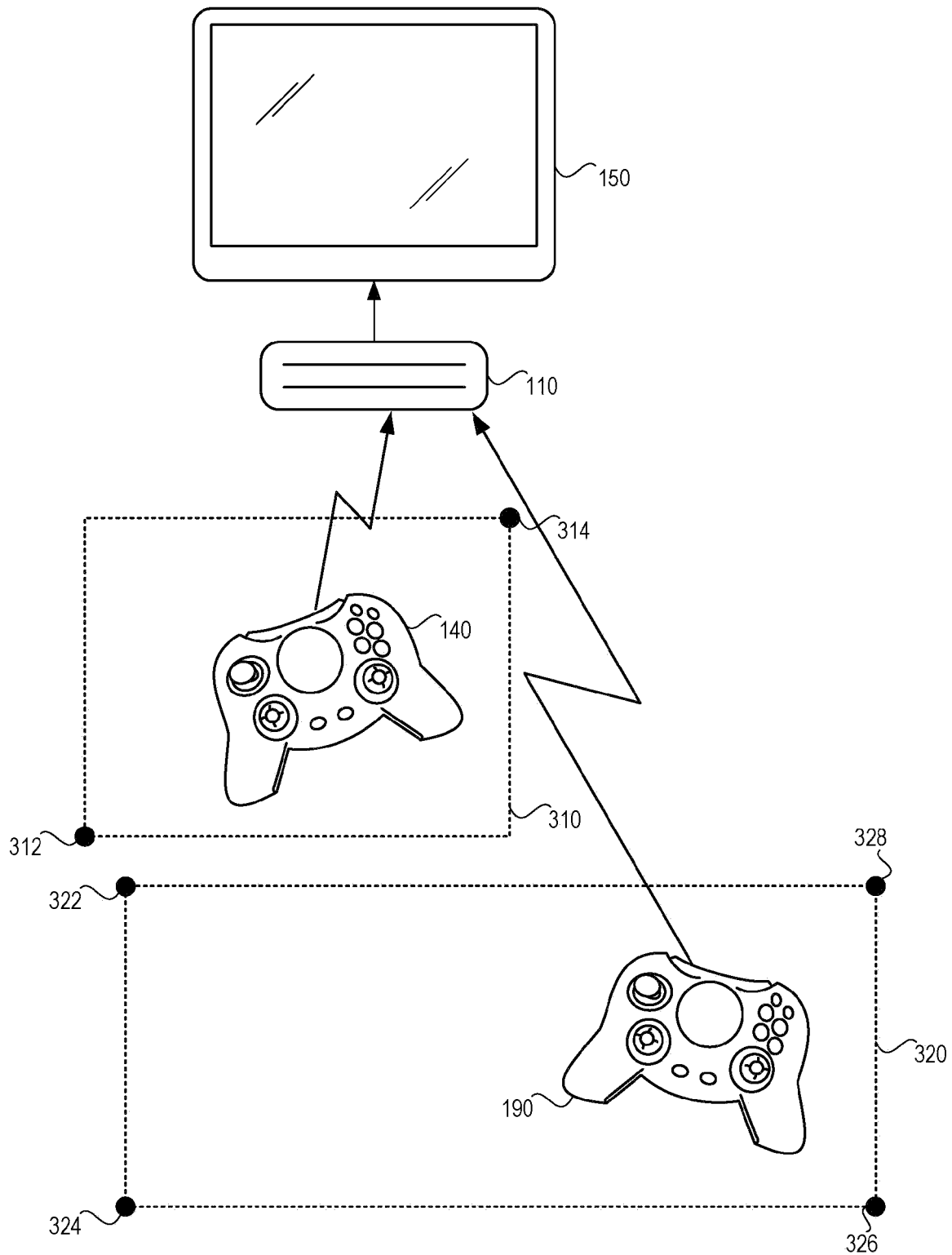
FIG. 3 shows a first example embodiment of the electronic game system of FIG. 1.
Figure 4:
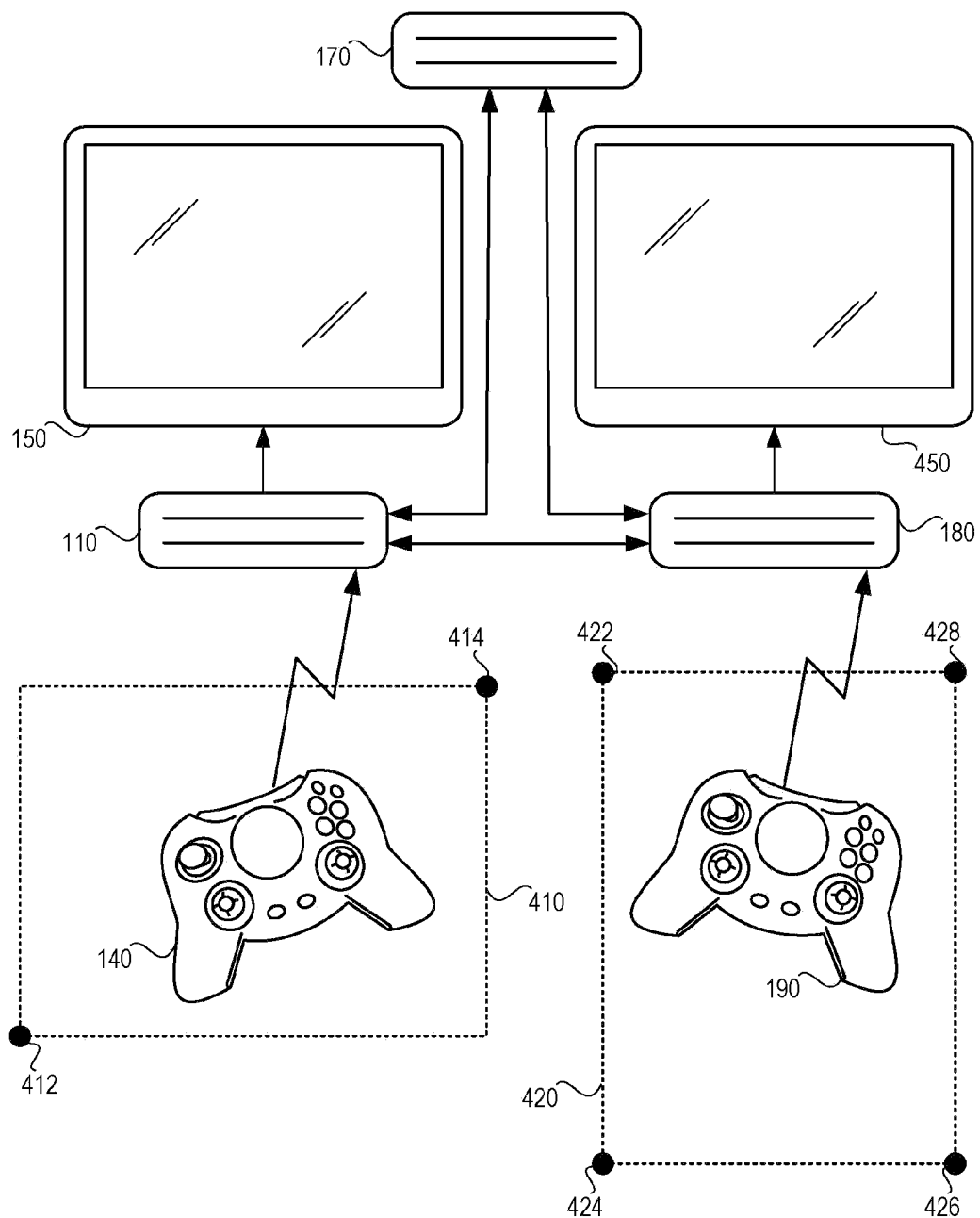
FIG. 4 shows a second example embodiment of the electronic game system of FIG. 1.

Electronic game system 100 may include a computing device 110. Computing device 110 may include memory 120, logic subsystem 130, and an input/output subsystem 132, among other suitable components. In some embodiments, computing device 110 is provided as an electronic game console as depicted in FIGS. 3 and 4.

Memory 120 may include one or more physical devices configured to hold data and/or instructions that, when executed by the logic subsystem, cause the logic subsystem to implement the herein described methods and processes. In some embodiments, instructions 122 may comprise one or more modules. As a non-limiting example, instructions 122 may comprise a game module 124, a mapping module 126, and a controller module 128. However, alternative and/or additional modules may be provided. Instructions 122 are described in greater detail with reference to the method of FIG. 2.

Memory 120 may include removable media and/or built-in devices. Memory 120 may include optical memory devices, semiconductor memory devices, and/or magnetic memory devices, among others. Memory 120 may include portions with one or more of the following characteristics: volatile, nonvolatile, dynamic, static, read/write, read-only, random access, sequential access, location addressable, file addressable, and content addressable. In some embodiments, logic subsystem 130 and memory 120 may be integrated into one or more common devices and/or computing systems.

Logic subsystem 130 may include one or more physical devices configured to execute one or more instructions (e.g., instructions 122). For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments. For example, logic subsystem 130 and logic subsystem 172 of hosting server 170 may cooperate to perform the herein described methods and processes.

Computing device 110 may communicate with other components of electronic game system 100, including one or more of a game controller 140, display device 150, audio output device 154, communication network 160, hosting server 170, and remote computing device 180. It should be appreciated that communication between these and other components described herein may include one or more of wireless communication and wired communication via one or more personal area network, local area network, and/or wide area network.

Further, in some embodiments, input/output subsystem 132 may communicate with two or more game controllers, including a second game controller 190 as indicated at 182. A non-limiting example of this configuration is depicted in FIG. 3. In other embodiments, second game controller 190 may communicate with remote computing device 180 as indicated at 184. A non-limiting example of this configuration is depicted in FIG. 4. In each of these embodiments, two or more controllers may be provided to enable multi-user game interaction. While a second game controller is provided as an example, it is to be understood that the concepts described herein may be extended to virtually any number of different controllers and/or different activity regions.

Computing device 110 may communicate with game controller 140 by transmitting data to game controller 140 and/or by receiving data from game controller 140. In some embodiments, computing device 110 may receive one or more of a calibration input and positioning information from a positioning device 142 of game controller 140. The calibration input and positioning information will be described in greater detail with reference to the method depicted in FIG. 2. For example, positioning device 142 may be configured to provide an indication of a position and/or an orientation of game controller 140 to the computing device.

Positioning device 142 may comprise one or more accelerometers, one or more optical elements, one or more gyroscopes, and/or one or more light emitting elements that may be utilized individually or in combination with one or more optical elements and light emitting elements of input/output subsystem 132 to enable identification of a position and/or an orientation of game controller 140 relative to input/output subsystem 132. While various examples are provided below for identifying a position and/or orientation of the game controller, it should be appreciated that any suitable approach may be used.

As one example, light emitted from light emitting elements of positioning device 142 may be captured at input/output subsystem 132 via one or more optical elements. For example, input/output subsystem 132 may include at least two optical elements that are spaced apart from each other for receiving the light emitted from one or more light emitting elements of positioning device 142. In this way, computing device 110 may identify the position and/or orientation of game controller 140 relative to input/output subsystem 132.

As another example, input/output subsystem 132 may include one or more light emitting elements, where light emitted from one or more of the light emitting elements of input/output subsystem 132 may be captured at positioning device 142 via one or more optical elements. For example, positioning device 142 may include one or more optical elements that enable positioning device 142 to identify a position and/or orientation of game controller 140 relative to input/output subsystem 132. In these embodiments, positioning device 142 may communicate the identified position and/or orientation back to input/output subsystem 132 as one or more of the calibration input and the positioning information where it may be utilized by computing device 110 in accordance with the method of FIG. 2.

In some embodiments, positioning device 142 may include one or more accelerometers that may output acceleration information that may be communicated to input/output subsystem 132 as one or more of the calibration input and the positioning information. In some embodiments, positioning device 142 may include a global positioning system (GPS) device. In some embodiments, signal triangulation may be utilized to identify a position and/or orientation of positioning device 142. In some embodiments, positioning device 142 may additionally and/or alternatively include one or more gyroscopes that report angular motion information to input/output subsystem 132. It should be appreciated that still other suitable approaches may be used to identify a position and/or orientation of the game controller.

It should be appreciated that input/output subsystem 132 and positioning device 142 may collectively utilize a combination of the approaches provided by the above examples for identifying the position and/or orientation of game controller 140 relative to input/output subsystem 132. Further it should be appreciated that a similar approach may be utilized to identify a position and/or an orientation of second game controller 190 via second positioning device 192. In this way, the position and/or orientation of one or more game controllers may be communicated to the computing device as one or more of a calibration input and positioning information.

Computing device 110 may also receive, via input/output subsystem 132, user input submitted at user input device 146 of game controller 140. User input device 146 may include one or more of a button, a joystick, a touch-sensitive surface, a microphone, or other suitable user input device. Similarly, user input may be submitted at a second user input device 196 of second game controller 190.

Computing device 110 may also output an interactive game response via feedback device 144 of game controller 140. Feedback device 144 may include one or more of an audio output device (e.g., audio speaker and/or audio amplifier), a display device (e.g., a light, graphical display, etc), and a haptic feedback device (e.g., a vibration module). In this way, computing device 110 may provide feedback to a user of the game controller via feedback device 144. Similarly, computing device 110 may output a second interactive game response via second feedback device 194 of second game controller 190. In embodiments where second game controller communicates with remote computing device 180, remote computing device 180 may output the second interactive game response via second feedback device 194.

Computing device 110 may also output the interactive game response via one or more of display device 150 and audio output device 154. Display device 150 may include a graphical display configured to present a graphical user interface 152. Audio output device 154 may include an audio speaker and an audio amplifier. In some embodiments, display device 150 and audio output device 154 may be combined as a common unit, such as a television. In some embodiments, the display device and/or the audio output device may be integrated within computing device 110 and/or game controller 140.

Communication network 160 may include one or more of a local area network and a wide area network (e.g., the Internet). Computing device 110 may communicate with one or more of hosting server 170 and remote computing device 180 via communication network 160. In some embodiments, the hosting server may be configured to host an interactive game session between two or more computing devices such as computing device 110 and remote computing device 180 as shown in FIG. 4. It should be appreciated that hosting server 170 may include memory 174 and a logic subsystem 172 as described with reference to memory 120 and logic subsystem 130 of computing device 110. As such, the methods described herein, or portions thereof, may be performed at hosting server 170 in some embodiments through execution of instructions stored in memory 174 by logic subsystem 172. In other embodiments, computing device 110 may self-serve a peer-to-peer interactive game.

In some embodiments, remote computing device 180 is similar to computing device 110, in that it may also include memory, a logic subsystem, an input/output system, and may similarly interact with its own game controller(s) (e.g., second game controller 190), audio output device, and/or display device.

For example, game controller 140 may be a first game controller of a plurality of game controllers that enable multi-player game interaction. Second game controller 190 may be provided that communicates with one or more of remote computing device 180 and computing device 110. As such, the first game controller (e.g. game controller 140) may include a first positioning device (e.g., positioning device 142) and the second game controller may include a second positioning device (e.g., second positioning device 192).

Second game controller 190 may be similar to game controller 140 in other respects. For example, in addition to the second positioning device, second game controller 190 may include one or more of a feedback device and a user input device. Where second game controller 190 communicates with input/output subsystem 132 of computing device 110 rather than remote computing device 180, communication network 160 and hosting server 170 may be optionally omitted from electronic game system 100 as shown in FIG. 3, for example.

Figure 2:
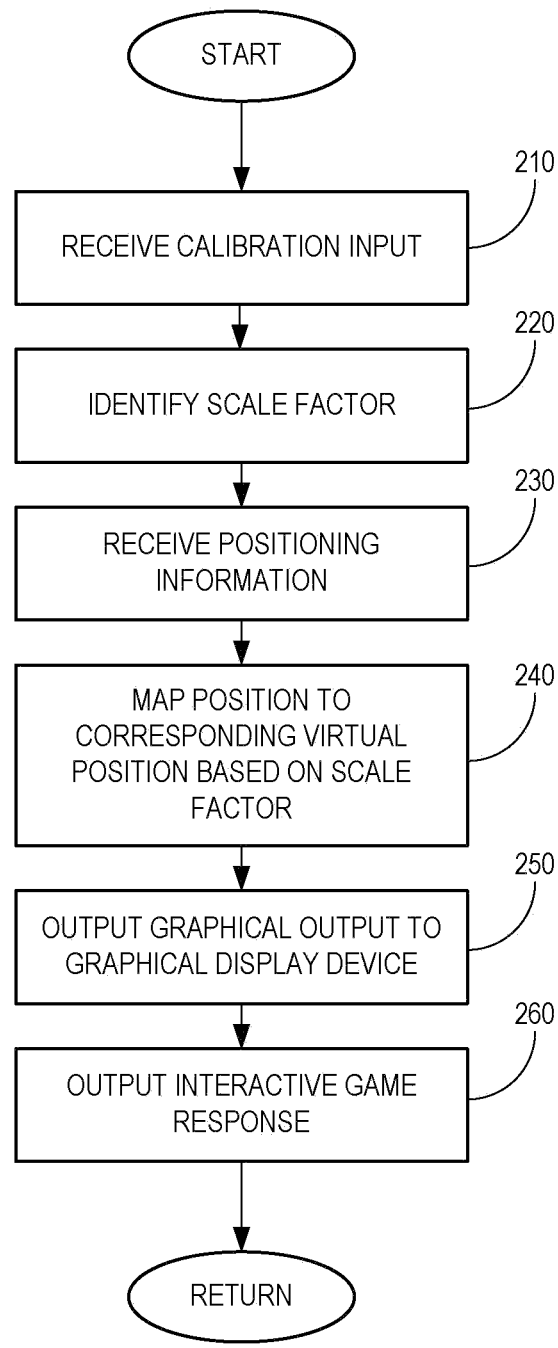
FIG. 2 shows an example embodiment of a method for linking an activity region in physical space to an interactive game region in virtual space.

FIG. 2 shows an example embodiment of a method for linking an activity region in physical space to an interactive game region in virtual space. At 210, the method may include receiving a calibration input from a positioning device of a game controller. For example, computing device 110 may receive the calibration input from positioning device 142 of game controller 140 via input/output subsystem 132.

In some embodiments, the calibration input indicates a plurality of waypoints defining an activity region in physical space. The term "physical space" is used herein to denote real two-dimensional or three-dimensional space in contrast to the term "virtual space" which is used herein to denote simulated or virtual two-dimensional or three-dimensional space.

Each waypoint indicated by the calibration input may correspond to a position in the physical space. For example, a user may define an activity region in the physical space within which the user may subsequently interact with the interactive game by moving the game controller between two or more different positions at which waypoints are set. In some embodiments, a waypoint may be set at a particular position responsive to a command issued by a user (e.g., pressing of a button). In other embodiments, waypoints may be automatically set responsive to the controller being moved to certain positions (e.g., a boundary waypoint may be automatically set to correspond to a northeast corner of the physical space responsive to the controller moving to its most-north and most-east observed position).

In some embodiments, the user may move the game controller between two or more different positions in two-dimensional or three-dimensional physical space to define the activity region. For example, referring to FIG. 3, a first activity region 310 is shown, which is defined by waypoint 312 and waypoint 314. Further, a second activity region 320 is shown, which is defined by waypoints 322, 324, 326, and 328. As such, each waypoint of the plurality of waypoints indicated by the calibration input may define a different position of the game controller as it is moved to define the activity region.

In some embodiments, input/output subsystem 132 may forward the calibration input received at 210 to controller module 128. The controller module may be configured to convert the calibration input into a format that is usable by the mapping module. For example, the controller module may be configured to convert the plurality of waypoints indicated by the calibration input into coordinates in one, two, or three dimensional space. The controller module may then forward the plurality of waypoints to the mapping module.

At 220, the method may include identifying a scale factor between the activity region and an interactive game region in virtual space based on the calibration input received at 210. In some embodiments, mapping module 126 may be configured to retrieve coordinates defining the interactive game region from game module 124. The mapping module may then compare the coordinates defining the interactive game region to the plurality of waypoints indicated by the calibration input received from the controller module. Based on this comparison, the mapping module may identify a scale factor between the activity region and the interactive game region.

At 230, the method may include receiving positioning information from the positioning device. The positioning information received at 230 may indicate a position of the positioning device within the activity region. In some embodiments, the positioning information received at 230 may be obtained in a similar manner as the calibration input that was received at 210. For example, positioning device 142 may provide positioning information to controller module 128 via the input/output subsystem that is representative of the game controller position within the activity region of the physical space. Where the game controller is moved within the activity region, the positioning information received at the input/output subsystem may indicate a path of motion of the game controller within the activity region and/or be interpreted to deduce a path of motion of the game controller within the activity region.

At 240, the method may include mapping the position of the positioning device within the activity region to a corresponding virtual position within the interactive game region based on the scale factor identified at 220. In some embodiments, the mapping module may map the position of the positioning device to the corresponding virtual position by scaling the position of the positioning device within the activity region to the corresponding virtual position within the interactive game region based on the scale factor.

In some embodiments, the mapping module may submit coordinates indicating the corresponding virtual position to the game module. In response to receiving an indication of the corresponding virtual position, the game module may perform various actions in accordance with a particular interactive game of the game module.

For example, at 250, the method may include outputting a graphical output to a display device. The graphical output may be configured to cause the display device to present a graphical user interface depicting one or more of the interactive game region and an indicator indicating the corresponding virtual position within the interactive game region. For example, the game module may represent the corresponding virtual position received from the mapping module as the indicator that is to be presented via graphical user interface 152 of display device 150.

In some embodiments, the graphical output may be further configured to cause the display device to present the graphical user interface depicting an interactive game object within the interactive game region. For example, the game module may present one or more interactive game objects via the graphical user interface in addition to the indicator.

Furthermore, in some embodiments, the interactive game object may include a second indicator indicating a second corresponding virtual position within the interactive game region of a second positioning device associated with second game controller 190.

In some embodiments, the interactive game object may be presented via the graphical user interface as a hidden interactive game object. For example, the hidden interactive game object may include a concealed secret passage or other suitable hidden object within the interactive game region that a user may be tasked with locating. As a non-limiting example, the electronic game system may provide a treasure hunt style interactive game.

At 260, the method may include outputting an interactive game response if the corresponding virtual position within the interactive game region satisfies a pre-determined proximal relationship to the interactive game object located within the interactive game region. For example, the game module may compare the corresponding virtual position to a position of the interactive game object located within the interactive game region to determine whether the pre-determined proximal relationship is satisfied. If the per-determined proximal relationship is satisfied, then the game module may output the interactive game response via the input/output subsystem.

As a non-limiting example, the pre-determined proximal relationship may include a proximity threshold of the corresponding virtual position to the interactive game object. For example, as the game controller is moved closer to the interactive game object to satisfy the proximity threshold, the interactive game response may be initiated at one or more of the game controller, the display device, and the audio output device to provide notification that the user is near the interactive game object.

In some embodiments, outputting the interactive game response at 260 includes outputting haptic feedback via the game controller. For example, feedback device 144 may comprise a haptic feedback device that may be actuated by the game module via the input/output subsystem to cause vibration or other suitable haptic feedback of the game controller that may be perceived by the user. As a non-limiting example, the game controller may be caused to vibrate when the game controller is within a prescribed distance from a hidden interactive game object, thereby alerting the user of the game controller to the presence and proximity of the hidden interactive game object.

In some embodiments, outputting the interactive game response at 260 includes outputting visual feedback via a graphical display of the game controller. For example, feedback device 144 may comprise a light emitting element or other suitable graphical display that may be illuminated by the game module via the input/output subsystem to cause visual feedback to be outputted by the game controller that may be perceived by the user. For example, an LED or other suitable light emitting element of the game controller may be caused to light up and/or blink to notify the user when the game controller is near the interactive game object.

In some embodiments, outputting the interactive game response at 260 includes outputting visual feedback via a remote display device. For example, the game module may cause remote display device 150 to present visual feedback via graphical user interface 152 that may be perceived by the user.

In some embodiments, outputting the interactive game response at 260 includes outputting aural feedback via an audio output device of the game controller. For example, feedback device 144 of the game controller may comprise the audio output device, including one or more of an audio speaker and/or an audio amplifier. The game module may cause the audio output device of the game controller to output aural feedback that may be perceived by the user.

In some embodiments, outputting the interactive game response at 260 includes outputting aural feedback via a remote audio output device. For example, the game module may cause remote audio output device 154 to output aural feedback that may be perceived by the user.

In some embodiments, outputting the interactive game response at 260 further includes increasing an intensity of the interactive game response as the corresponding virtual position within the interactive game region approaches the interactive game object located within the interactive game region. Further still, the intensity of the interactive game response may be reduced as the corresponding virtual position moves away from the interactive game object.

As a non-limiting example, once the pre-determined proximal relationship between the corresponding virtual position and the interactive game object has been satisfied and the interactive game response has been outputted, the game module may cause the intensity of the interactive game response to increase as the proximity of the corresponding virtual position to the interactive game object decreases.

In some embodiments, the intensity of the interactive game response may be increased by increasing one or more of a volume of the aural output, a frequency and/or magnitude of the haptic feedback (e.g., vibrational frequency and/or vibrational magnitude), and a frequency and/or magnitude of the visual feedback provided via the graphical display of the game controller or the graphical user interface of the remote display device.

It should be appreciated that other characteristics of the interactive game response may be adjusted responsive to the proximity of the corresponding virtual position to the interactive game object. For example, different types of feedback may be initiated or discontinued at different pre-determined proximities as the corresponding virtual position approaches or moves away from the interactive game object.

The method of FIG. 2 may be performed by the electronic game system to provide one or more of the following user experiences.

In one example, a user tags a "hot spot" (i.e., the interactive game object), where the game module is configured to manipulate the hot spot (e.g., move the hot spot). In turn, the user may be tasked with interacting with the hot spot as it is manipulated by the game module. For example, the hot spot may be moved 5 feet to the left and 5 feet forward, whereby the user is prompted to move the game controller 5 feet to the left and 5 feet forward in the activity region.

As another example, a user is prompted by the game module to tag musical notes at different hot spots in the interactive game region, whereby the user is directed to move the game controller within the activity region to produce a song. Two or more users may compete to produce the most accurate representation of the song through movement of their respective game controller.

One or more users may be prompted to play a game of "hide and seek" where the interactive game response is outputted by the electronic game system to notify the users when they are near an interactive game object.

A user may be prompted to define a portion of a physical object in physical space to be represented as the interactive game object in the virtual space. For example, a user may mark the edges of a rug to equate to a wrestling ring in a sumo wrestling game, where moving the game controller outside of the wrestling ring equates to a disqualification of the user.

As another example, a user may define zones in their activity region to be a location of a target or other suitable object that is mapped into virtual space. A second user acting as an opponent may define a region using a second game controller to be a location of a salvo, whereby the game module compares the locations of the second game controller in virtual space to calculate if a hit of the target has been achieved.

As yet another example, a user may tag a physical object in physical space and declare it to equate to an interactive game object in the virtual world. For example, a coffee table in physical space may be tagged by the user as the interactive game object through manipulation of the game controller. A subsequent position of the game controller relative to this interactive game object in the physical space may be translated to an avatar location in the virtual space relative to the interactive game object.

Where the game controller (e.g., game controller 140) is a first game controller of a plurality of game controllers, the method of FIG. 2 may be performed by the electronic game system for each game controller. For example, the calibration input received at 210 may be a first calibration input of a plurality of calibration inputs. As such, the method at 210 may include receiving a first calibration input from the first positioning device, where the first calibration input indicates a plurality of waypoints defining a first activity region in physical space. At 210, the method may further include receiving a second calibration input from the second positioning device, where the second calibration input indicates a plurality of waypoints defining a second activity region in physical space.

FIG. 3 shows an example of first activity region 310 defined by a plurality of waypoints indicated by the first calibration input received from game controller 140. FIG. 3 further shows an example of the second activity region 320 defined by a plurality of waypoints indicated by the second calibration input received from second game controller 190.

It should be appreciated that FIG. 3 depicts an example embodiment where second game controller 190 communicates with computing device 110 as indicated at 182 of FIG. 1. By contrast, FIG. 4 depicts an example embodiment where second game controller 190 instead communicates with remote computing device 180 as indicated at 184 of FIG. 1. As such, FIG. 4 shows a first activity region 410 defined by waypoints 412 and 414 that are indicated by a first calibration input received at computing device 110 from game controller 140. FIG. 4 further shows a second activity region 420 defined by waypoints 422, 424, 426, and 428 that are indicated by a second calibration input received at remote computing device 180 from second game controller 190.

FIG. 4 further shows computing device 110 and remote computing device 180 communicating with each other either directly (e.g., peer-to-peer via a local area network or wide area network) or via hosting server 170. FIG. 4 also depicts a remote display device 450 that may communicate with remote computing device 180. In this way, two or more users may reside at different physical locations, but interact with one another in the same virtual space.

At 220, the method may include identifying a first scale factor between the first activity region and an interactive game region in virtual space based on the first calibration input. At 220, the method may further include identifying a second scale factor between the second activity region and an interactive game region in virtual space based on the calibration input.

At 230, the method may include receiving positioning information from the first positioning device, where the positioning information received from the first positioning device indicates a position of the positioning device within the first activity region. The method at 230 may further include receiving positioning information from the second positioning device, where the positioning information received from the second positioning device indicates a position of the second positioning device within the second activity region.

At 240, the method may include mapping the position of the first positioning device within the first activity region to a first corresponding virtual position within the interactive game region based on the first scale factor. The method at 240 may further include mapping the position of the second positioning device within the second activity region to a second corresponding virtual position within the interactive game region based on the second scale factor. In this way, a corresponding virtual position of game controller 140 within the interactive game region and a second corresponding virtual position of second game controller 190 within the interactive game region may be identified by the computing device.

In some embodiments, the second corresponding virtual position may define the location of the interactive game object within the interactive game region as previously described at 250. For example, a user of the second game controller may manipulate the location of the interactive game object by moving the second game controller within the second activity region. The interactive game response may be outputted in accordance with the previously described predetermined proximal relationship, for example, if the first corresponding virtual position satisfies the predetermined proximal relationship to the second corresponding virtual position defining the location of the interactive game object.

In this way, the game module of the electronic game system may enable game play based on a calculation of a distance between and/or direction from a first game controller to a second game controller. For example, the game module may prompt two or more users to play an interactive game where users may pass a virtual baton in a relay race, play pin the tail on the donkey, or define an apparatus such as a limbo stick in a game of limbo where each end of the limbo stick is represented by a different game controller.

In some embodiments, the second corresponding virtual position may define one of a plurality of virtual positions that are received from the game controller, whereby the plurality of virtual positions define the interactive game object in virtual space. In this way, the game controller may be manipulated by the user within the activity region to define interactive game objects having one, two, or three dimensions in the interactive game region.

At 250, the method may include outputting a graphical output to the remote display device, where the graphical output is configured to cause the remote display device to present a graphical user interface depicting the interactive game region and one or more of a first indicator indicating the first corresponding virtual position within the interactive game region and a second indicator indicating the second corresponding virtual position within the interactive game region. In this way, users may be provided with visual feedback as to their respective virtual positions within the interactive game region.

It should be appreciated that the methods provided herein, may be performed by the electronic game system by execution by a logic subsystem of instructions held in memory, including one or more of logic subsystem 130, logic subsystem 172, and a logic subsystem of remote computing device 180. It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of linking an activity region in a physical space to an interactive game region in a virtual space, the method comprising:

receiving at a computing device a first calibration input from a first positioning device of a first game controller, the first calibration input indicating a location of the first game controller in the physical space at each of a first plurality of different times;

recognizing for each of the first plurality of different times, an associated waypoint of a first plurality of waypoints;

defining a first activity region for the first game controller in the physical space, the first activity region bound by the first plurality of waypoints;

receiving at the computing device a second calibration input from a second game controller, the second calibration input indicating a location of the second game controller in the physical space at each of a plurality of different times;

recognizing for each of the second plurality of different times, an associated waypoint of a second plurality of waypoints;

defining a second activity region for the second game controller in the physical space, the second activity region bound by the second plurality of waypoints;

receiving by the computing device positioning information from the first positioning device, the positioning information indicating a position of the first positioning device within the first activity region between two or more of the recognized waypoints of the first plurality of waypoints; and mapping by the computing device the position of the first positioning device within the first activity region to a corresponding virtual position within an interactive game region in virtual space.

2. The method of claim 1, further comprising outputting a graphical output to a display device, the graphical output configured to cause the display device to present a graphical user interface depicting the interactive game region and an indicator indicating the corresponding virtual position within the interactive game region.

3. The method of claim 2, where the graphical output is further configured to cause the display device to present the graphical user interface depicting an interactive game object within the interactive game region as a hidden interactive game object.

4. The method of claim 1, further comprising outputting an interactive game response if the corresponding virtual position within the interactive game region satisfies a pre-determined proximal relationship to an interactive game object located within the interactive game region.

5. The method of claim 4, where outputting the interactive game response further includes increasing an intensity of the interactive game response as the corresponding virtual position within the interactive game region approaches the interactive game object located within the interactive game region.

6. The method of claim 4, where outputting the interactive game response includes outputting haptic feedback via the game controller.

7. The method of claim 4, where outputting the interactive game response includes outputting visual feedback via a graphical display of the game controller.

8. The method of claim 4, where outputting the interactive game response includes outputting aural feedback via an audio output device of the game controller.

9. The method of claim 4, where outputting the interactive game response includes outputting aural feedback via an audio output device.

10. The method of claim 1, where the interactive game region is provided by a game module of the electronic game system.

11. The method of claim 1, further comprising identifying by the computing device a scale factor between the first activity region and the interactive game region in virtual space based on the first calibration input, the first activity region being a different size than the interactive game region and a different size than the second activity region, and wherein mapping the position of the first positioning device comprises mapping the first positioning device within the first activity region to the corresponding virtual position within the interactive game region based on the scale factor.

12. The method of claim 11,
identifying a second scale factor between the second activity region and the interactive game region based on the second calibration input;
receiving positioning information from the second positioning device, the positioning information received from the second positioning device indicating a position of the second positioning device within the second activity region; and
mapping the position of the second positioning device within the second activity region to a second corresponding virtual position within the interactive game region based on the second scale factor.

13. The method of claim 12, further comprising outputting an interactive game response if the corresponding virtual position within the interactive game region satisfies a pre-determined proximal relationship to an interactive game object located within the interactive game region; where the second corresponding virtual position defines a location of the interactive game object within the interactive game region.

14. An electronic game system configured to facilitate an interactive game, comprising:
a logic subsystem;
memory holding instructions that, when executed by a logic subsystem, cause the logic subsystem to:
receive a first calibration input from a first positioning device of a first game controller, the first calibration input indicating a location of the first game controller in the physical space at each of a first plurality of different times;
recognizing for each of the first plurality of different times, an associated waypoint of a first plurality of waypoints;
defining a first activity region in the physical space, the first activity region bounded by the first plurality of waypoints;
receiving a second calibration input from a second game controller, the second calibration input indicating a location of the second game controller in the physical space at each of a plurality of different times;
recognizing for each of the second plurality of different times, an associated waypoint of a second plurality of waypoints;
defining a second activity region for the second game controller in the physical space, the second activity region being different than the first activity region and bound by the second plurality of waypoints;
receive positioning information from the first positioning device, the positioning information indicating a position of the first positioning device within the first activity region between two or more of the recognized waypoints of the first plurality of waypoints; and
map the position of the first positioning device within the first activity region to a corresponding virtual position within an interactive game region in virtual space.

15. The electronic game system of claim 14, the memory further holding instructions that, when executed by a logic subsystem, cause the logic subsystem to:
output a graphical output to a display device, the graphical output configured to cause the display device to present a graphical user interface depicting the interactive game region and an indicator indicating the corresponding virtual position within the interactive game region.

16. The electronic game system of claim 14, the memory further holding instructions that, when executed by a logic subsystem, cause the logic subsystem to:
output an interactive game response if the corresponding virtual position within the interactive game region satisfies a pre-determined proximal relationship to an interactive game object located within the interactive game region.

17. The electronic game system of claim 16, the memory further holding instructions that, when executed by a logic subsystem, cause the logic subsystem to:
increase an intensity of the interactive game response as the corresponding virtual position within the interactive game region approaches the interactive game object located within the interactive game region.

18. The electronic game system of claim 17, the memory further holding instructions that, when executed by a logic subsystem, cause the logic subsystem to:
output the interactive game response as haptic feedback via the game controller.

19. The electronic game system of claim 14, wherein the memory further holds instructions that, when executed by the logic subsystem, cause the logic subsystem to:
identify a scale factor between the first activity region and the interactive game region in virtual space based on the first calibration input, the interactive game region being provided by a game module of the electronic game system,
and wherein mapping the position of the first positioning device comprises mapping the position of the first positioning device within the first activity region to the corresponding virtual position within the interactive game region based on the scale factor.

20. The electronic game system of claim 19, the memory further holding instructions that, when executed by a logic subsystem, cause the logic subsystem to:
identify a second scale factor between the second activity region and the interactive game region based on the second calibration input;
receive positioning information from the second positioning device, the positioning information received from the second positioning device indicating a position of the second positioning device within the second activity region; and
map the position of the second positioning device within the second activity region to a second corresponding virtual position within the interactive game region based on the second scale factor.

21. The electronic game system of claim 20, further comprising outputting an interactive game response if the corresponding virtual position within the interactive game region satisfies a pre-determined proximal relationship to an interactive game object located within the interactive game region; where the second corresponding virtual position defines a location of the interactive game object within the interactive game region.

22. An electronic game system, comprising:
a logic subsystem;
a first game controller including a first positioning device;
a second game controller including a second positioning device;
memory holding instructions that, when executed by a logic subsystem, cause the logic subsystem to:
receive a first calibration input from the first positioning device, the first calibration input indicating a location of the first game controller in the physical space at each of a first plurality of different times;
recognizing for each of the first plurality of different times, an associated waypoint of a first plurality of waypoints;
defining a first activity region in the physical space, the first activity region bound by the first plurality of waypoints;
receive positioning information from the first positioning device, the positioning information received from the first positioning device indicating a position of the first positioning device within the first activity region between two or more fo the recognized waypoints of the first plurality of waypoints; and
map the position of the first positioning device within the activity region to a first corresponding virtual position within an interactive game region in virtual space;
receive a second calibration input from the second positioning device, the second calibration input indicating a location of the second game controller in the physical space at each of a plurality of different times;
recognizing for each of the second plurality of different times, an associated waypoint of a second plurality of waypoints;
defining a second activity region in the physical space, the second activity region bound by the second plurality of waypoints;
receive positioning information from the second positioning device, the positioning information received from the second positioning device indicating a position of the second positioning device within the second activity region between two or more of the recognized waypoints of the second plurality of waypoints;
map the position of the second positioning device within the second activity region to a second corresponding virtual position within the interactive game region; and
output a graphical output to a display device, the graphical output configured to cause the display device to present a graphical user interface depicting the interactive game region and one or more of a first indicator indicating the first corresponding virtual position within the interactive game region and a second indicator indicating the second corresponding virtual position within the interactive game region.

23. The electronic game system of claim 22, wherein the memory further holds instructions that, when executed by the logic subsystem, cause the logic subsystem to:
identify a first scale factor between the first activity region and an interactive game region in virtual space based on the first calibration input, and
identify a second scale factor between the second activity region and the interactive game region in virtual space based on the second calibration input,
wherein mapping the position of the first positioning device comprises mapping the position of the first positioning device within the first activity region to the first corresponding virtual position within the interactive game region based on the first scale factor, and
wherein mapping the position of the second positioning device comprises mapping the position of the second positioning device within the second activity region to the second corresponding virtual position within the interactive game region based on the second scale factor.

* * * * *